(12) United States Patent
Gimblet et al.

(10) Patent No.: US 9,073,243 B2
(45) Date of Patent: Jul. 7, 2015

(54) FIBER OPTIC CABLES WITH ACCESS FEATURES AND METHODS OF MAKING FIBER OPTIC CABLES

(71) Applicants: Michael John Gimblet, Conover, NC (US); Julian Latelle Greenwood, III, Hickory, NC (US)

(72) Inventors: Michael John Gimblet, Conover, NC (US); Julian Latelle Greenwood, III, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 169 days.

(21) Appl. No.: 13/660,224

(22) Filed: Oct. 25, 2012

(65) Prior Publication Data

US 2013/0051743 A1    Feb. 28, 2013

Related U.S. Application Data

(63) Continuation of application No. PCT/US2011/034309, filed on Apr. 28, 2011.

(60) Provisional application No. 61/330,038, filed on Apr. 30, 2010.

(51) Int. Cl.
| | |
|---|---|
| *G02B 6/44* | (2006.01) |
| *B29C 47/02* | (2006.01) |
| *B29C 47/00* | (2006.01) |
| *B29C 47/06* | (2006.01) |
| *B29C 47/28* | (2006.01) |
| *H01B 13/14* | (2006.01) |
| *B29K 23/00* | (2006.01) |
| *B29K 27/06* | (2006.01) |

(Continued)

(52) U.S. Cl.
CPC .......... *B29C 47/025* (2013.01); *B29C 47/0014* (2013.01); *B29C 47/062* (2013.01); *B29C 47/28* (2013.01); *B29K 2023/06* (2013.01); *B29K 2023/0641* (2013.01); *B29K 2023/083* (2013.01); *B29K 2023/12* (2013.01); *B29K 2027/06* (2013.01); *B29K 2027/16* (2013.01); *B29K 2067/006* (2013.01); *B29K 2069/00* (2013.01); *B29K 2105/0026* (2013.01); *B29K 2105/16* (2013.01); *G02B 6/4486* (2013.01); *G02B 6/4495* (2013.01); *H01B 13/141* (2013.01)

(58) Field of Classification Search
CPC ...................................... G02B 6/4495
See application file for complete search history.

(56) References Cited

U.S. PATENT DOCUMENTS

| | | |
|---|---|---|
| 3,076,235 A | 2/1963 | Rollins et al. |
| 3,991,014 A | 11/1976 | Kleinschuster ............ 260/47 |

(Continued)

FOREIGN PATENT DOCUMENTS

| | | | |
|---|---|---|---|
| DE | 4421456 A1 | 12/1995 | ............ B29C 47/02 |
| EP | 647866 A1 | 4/1995 | ............ G02B 6/44 |

(Continued)

OTHER PUBLICATIONS

U.S. Appl. No. 13/445,517, filed Apr. 12, 2012, Eric R. Logan, 29 pages.

(Continued)

*Primary Examiner* — Sung Pak
(74) *Attorney, Agent, or Firm* — William D. Doyle

(57) ABSTRACT

Cables are constructed with extruded discontinuities in the cable jacket that allow the jacket to be torn to provide access to the cable core. The discontinuities can be longitudinally extending strips of material in the cable jacket.

19 Claims, 6 Drawing Sheets

(51) Int. Cl.
  B29K 27/00 (2006.01)
  B29K 67/00 (2006.01)
  B29K 69/00 (2006.01)
  B29K 105/00 (2006.01)
  B29K 105/16 (2006.01)

(56) References Cited

U.S. PATENT DOCUMENTS

| | | | |
|---|---|---|---|
| 4,067,852 A | 1/1978 | Calundann | 260/47 |
| 4,083,829 A | 4/1978 | Calundann et al. | 260/47 |
| 4,130,545 A | 12/1978 | Calundann | 260/40 P |
| 4,237,337 A | 12/1980 | Serrander | 174/70 R |
| 4,248,824 A | 2/1981 | Hattop | 264/171 |
| 4,318,842 A | 3/1982 | East et al. | 524/605 |
| 4,456,331 A | 6/1984 | Whitehead et al. | 350/96.23 |
| 4,468,364 A | 8/1984 | Ide | 264/176 R |
| 4,707,074 A | 11/1987 | Heywood | 350/96.23 |
| 4,729,628 A | 3/1988 | Kraft et al. | 350/96.23 |
| 4,848,868 A | 7/1989 | Rohner | 350/96.23 |
| 4,909,593 A * | 3/1990 | Harbort et al. | 385/109 |
| 5,218,659 A | 6/1993 | Schneider | 385/110 |
| 5,360,497 A | 11/1994 | Schneider et al. | 156/47 |
| 5,442,722 A | 8/1995 | DeCarlo | 385/114 |
| 5,636,308 A | 6/1997 | Personne et al. | 385/102 |
| 5,651,081 A | 7/1997 | Blew et al. | 385/101 |
| 5,717,805 A | 2/1998 | Stulpin | 385/114 |
| 5,737,470 A | 4/1998 | Nagano et al. | 385/114 |
| 5,970,196 A | 10/1999 | Greveling et al. | |
| 5,987,204 A | 11/1999 | Lee et al. | 385/100 |
| 6,041,153 A | 3/2000 | Yang | 385/109 |
| 6,088,499 A | 7/2000 | Newton et al. | 385/112 |
| 6,137,936 A | 10/2000 | Fitz et al. | 385/113 |
| 6,167,180 A | 12/2000 | Keller | 385/113 |
| 6,222,969 B1 | 4/2001 | Botelho et al. | 385/114 |
| 6,311,000 B1 | 10/2001 | Schneider | 385/113 |
| 6,351,589 B1 | 2/2002 | Leggett | 385/128 |
| 6,404,962 B1 | 6/2002 | Hardwick, III et al. | 385/114 |
| 6,519,396 B2 | 2/2003 | Schneider et al. | 385/101 |
| 6,542,674 B1 | 4/2003 | Gimblet | 385/113 |
| 6,545,222 B2 | 4/2003 | Yokokawa et al. | 174/110 R |
| 6,546,176 B2 | 4/2003 | Anderson et al. | 385/113 |
| 6,563,991 B1 | 5/2003 | Witt et al. | 385/107 |
| 6,603,908 B2 | 8/2003 | Dallas et al. | 385/109 |
| 6,661,956 B2 | 12/2003 | Yamasaki et al. | 385/109 |
| 6,704,481 B2 | 3/2004 | Gaillard et al. | 385/113 |
| 6,728,455 B2 | 4/2004 | Kusakari et al. | 385/113 |
| 6,760,522 B2 | 7/2004 | Okada et al. | 385/109 |
| 6,766,091 B2 | 7/2004 | Beuth et al. | 385/128 |
| 6,813,421 B2 | 11/2004 | Lail et al. | 385/101 |
| 6,876,798 B2 | 4/2005 | Triplett et al. | 385/100 |
| 6,957,000 B2 | 10/2005 | McAlpine et al. | 385/102 |
| 7,029,137 B2 | 4/2006 | Lionetti et al. | 362/84 |
| 7,050,685 B2 | 5/2006 | Plemmons et al. | 385/109 |
| 7,085,459 B2 | 8/2006 | Conrad et al. | 385/114 |
| 7,116,872 B2 | 10/2006 | Okuno et al. | 385/114 |
| 7,123,801 B2 | 10/2006 | Fitz | 385/105 |
| 7,136,556 B2 | 11/2006 | Brown et al. | 385/102 |
| 7,187,830 B2 | 3/2007 | Blazer | 385/114 |
| 7,197,215 B2 | 3/2007 | Baird et al. | 385/113 |
| 7,218,821 B2 | 5/2007 | Bocanegra et al. | 385/113 |
| 7,225,534 B2 | 6/2007 | Kachmar | 29/825 |
| 7,251,411 B1 | 7/2007 | Lu et al. | 385/147 |
| 7,346,244 B2 | 3/2008 | Gowan et al. | 385/113 |
| 7,379,642 B2 | 5/2008 | Kachmar | 385/102 |
| 7,391,943 B2 * | 6/2008 | Blazer et al. | 385/113 |
| 7,400,810 B2 | 7/2008 | Tanaka et al. | 385/134 |
| 7,403,685 B2 | 7/2008 | Wells | 385/100 |
| 7,415,181 B2 | 8/2008 | Greenwood et al. | 385/100 |
| 7,424,189 B2 | 9/2008 | Lu et al. | 385/100 |
| 7,471,862 B2 | 12/2008 | Bringuier et al. | 385/113 |
| 7,480,436 B2 | 1/2009 | Wells et al. | 385/134 |
| 7,489,843 B2 | 2/2009 | Carlson et al. | 385/100 |
| 7,532,796 B2 | 5/2009 | Chiasson | 385/114 |
| 7,539,380 B1 | 5/2009 | Abernathy et al. | 385/100 |
| 7,567,741 B2 | 7/2009 | Abernathy et al. | 385/113 |
| 7,587,111 B2 | 9/2009 | de Montmorillon et al. | 385/127 |
| 7,590,321 B2 | 9/2009 | Lu et al. | 385/104 |
| 7,603,012 B1 | 10/2009 | Ice | 385/103 |
| 7,623,747 B2 | 11/2009 | De Montmorillon et al. | 385/124 |
| 7,693,375 B2 | 4/2010 | Freeland et al. | 385/100 |
| 7,787,727 B2 | 8/2010 | Bringuier et al. | 385/113 |
| 7,796,853 B2 | 9/2010 | Abernathy et al. | 385/100 |
| 7,817,891 B2 | 10/2010 | Lavenne et al. | 385/109 |
| 8,582,939 B2 * | 11/2013 | Gimblet et al. | 385/100 |
| 2003/0095763 A1 * | 5/2003 | Dallas et al. | 385/109 |
| 2003/0118295 A1 | 6/2003 | Lail et al. | 385/101 |
| 2006/0045443 A1 | 3/2006 | Blazer | 385/114 |
| 2006/0127016 A1 * | 6/2006 | Baird et al. | 385/113 |
| 2006/0210750 A1 * | 9/2006 | Morrow et al. | 428/36.9 |
| 2006/0291787 A1 | 12/2006 | Seddon | 385/113 |
| 2008/0013899 A1 | 1/2008 | Gowan et al. | 385/113 |
| 2008/0193092 A1 | 8/2008 | Greenwood et al. | 385/113 |
| 2009/0087148 A1 | 4/2009 | Bradley et al. | 385/76 |
| 2009/0274425 A1 | 11/2009 | Caldwell et al. | 385/102 |
| 2009/0274426 A1 | 11/2009 | Lail | 385/105 |
| 2009/0317039 A1 | 12/2009 | Blazer et al. | 385/107 |
| 2009/0324182 A1 | 12/2009 | Kachmar et al. | 385/104 |
| 2010/0132973 A1 | 6/2010 | Fitz et al. | 174/102 R |
| 2011/0217010 A1 | 9/2011 | Kachmar | 385/111 |
| 2011/0229098 A1 | 9/2011 | Abernathy et al. | 385/102 |
| 2013/0216192 A1 * | 8/2013 | Gimblet et al. | 385/100 |

FOREIGN PATENT DOCUMENTS

| | | | |
|---|---|---|---|
| EP | 749129 A1 | 12/1996 | H01B 7/00 |
| EP | 1168024 A2 | 1/2002 | G02B 6/44 |
| EP | 1376156 B1 | 7/2006 | G02B 1/04 |
| JP | 60-91306 A | 5/1985 | G02B 6/24 |
| JP | 63-120206 U | 8/1988 | G02B 6/08 |
| JP | 9-230184 A | 9/1997 | G02B 6/44 |
| JP | 9230184 A | 9/1997 | |
| JP | 2001023445 A | 1/2001 | |
| JP | 2001318286 A | 11/2001 | |
| JP | 2005-148373 A | 6/2005 | G02B 6/44 |
| JP | 2005-345622 | 12/2005 | G02B 6/44 |
| JP | 2006-162703 A | 6/2006 | G02B 6/44 |
| JP | 2006-171570 A | 6/2006 | G02B 6/44 |
| JP | 2006-251769 A | 9/2006 | G02B 6/44 |
| JP | 2006-251770 A | 9/2006 | G02B 6/44 |
| JP | 2006-267600 | 10/2006 | G02B 6/44 |
| JP | 2007-272006 | 10/2007 | G02B 6/44 |
| JP | 2007531021 A | 11/2007 | |
| JP | 2009-037150 | 2/2009 | G02B 6/44 |
| JP | 2009-258153 A | 11/2009 | G02B 6/44 |
| KR | 2006-0081266 | 7/2006 | G02B 6/44 |
| KR | 2006-0107414 | 10/2006 | G02B 6/02 |
| WO | 03/046074 A1 | 6/2003 | C08L 23/16 |
| WO | 2004/021367 A2 | 3/2004 | H01B 7/00 |
| WO | 2005/096053 A1 | 10/2005 | G02B 6/44 |
| WO | 2006/097540 A1 | 9/2006 | G02B 6/44 |
| WO | 2011/109498 A2 | 9/2011 | |
| WO | 2011/137236 A1 | 11/2011 | B29C 47/02 |
| WO | 2012/058181 A1 | 5/2012 | G02B 6/44 |
| WO | 2012/071490 A2 | 5/2012 | B29C 47/02 |

OTHER PUBLICATIONS

U.S. Appl. No. 13/489,901, filed Jun. 6, 2012, Michael J. Gimblet, 23 pages.
U.S. Appl. No. 13/560,374, filed Jul. 27, 2012, Michael John Gimblet, 24 pages.
U.S. Appl. No. 13/646,962, filed Oct. 8, 2012, Anne Germaine Bringuier, 26 pages.
U.S. Appl. No. 13/658,404, filed Oct. 23, 2012, Michael John Gimblet, 21 pages.
U.S. Appl. No. 13/658,431, filed Oct. 23, 2012, Samuel Don Nave, 19 pages.
Nippon Telegraph and Telephone Corporation, Specification for Aerial SM Optical Fiber Cable, Spec. No. 520292, 4$^{th}$ Version, Jul. 29, 2002, 56 pages.
Renka Corporation, Single Mode Optical Fiber Cable, Specification No: RENKA/OFC/SM-DI/AR, Dec. 2000, 13 pages.

(56) References Cited

OTHER PUBLICATIONS

PCT IPRP for Publication WO2011137236, Nov. 6, 2011, 10 pages.
PCT ISR for Publication WO2011137236, Aug. 9, 2011, 6 pages.
PCT ISR for Publication WO2012058181, Feb. 23, 2012, 4 pages.
PCT ISR for Publication WO2012071490, Sep. 12, 2012, 7 pages.
Japanese Office Action for Application No. 2013-508249, dated Mar. 5, 2015, 3 pages.

* cited by examiner a fiber optic cable illustrated in FIG. 1.

FIBER OPTIC CABLES WITH ACCESS FEATURES AND METHODS OF MAKING FIBER OPTIC CABLES

RELATED APPLICATIONS

This application is a continuation of International Application No. PCT/US11/34309 filed Apr. 28, 2011, which claims the benefit of priority to U.S. Application No. 61/330,038, filed Apr. 30, 2010, both applications being incorporated herein by reference.

BACKGROUND

Fiber optic cables typically include one or more optical fibers surrounded by a protective polymer jacket. The jacket must be robust enough to endure various environmental conditions, yet must also allow field technicians to access the enclosed optical fibers without undue effort and time. Various solutions have been proposed to provide access to optical fibers in a cable core, including the inclusion of ripcords and other means. U.S. Pat. No. 5,970,196 includes large inserts that can be removable from a cable jacket to allow access to the cable core. The inserts are so large, however, that mechanical performance of the cable may suffer as the size of the inserts allow large sections of the cable/tube jacket to bend and flex in dissimilar modes.

U.S. Pat. No. 7,187,830 discloses the creation of voids filled with liquid or gas, but such voids may also adversely affect structural integrity of some cable jacket types, as well as providing paths for water ingress.

SUMMARY

According to one embodiment, a cable comprises a core and a jacket surrounding the core. The jacket comprises a main portion of a first material, and at least one discontinuity of a second material. The discontinuity extends along a length of the cable, and the bond between the main portion and the discontinuity allows the jacket to be separated at the discontinuity to provide access to the core. The discontinuity may constitute a relatively small portion of the overall jacket area and may remain integral with the jacket after access.

According to a first aspect, the main portion and the discontinuity can be extruded together so that the first and second materials flow together during extrusion, and bond together during cooling. The second material can flow into a trough formed in the first material during extrusion.

According to a second aspect, the second material of the discontinuities can include selected quantities of the first material to enhance bonding between the main portion and the discontinuities.

Those skilled in the art will appreciate the above stated advantages and other advantages and benefits of various additional embodiments reading the following detailed description with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

DETAILED DESCRIPTION

Figure 1:
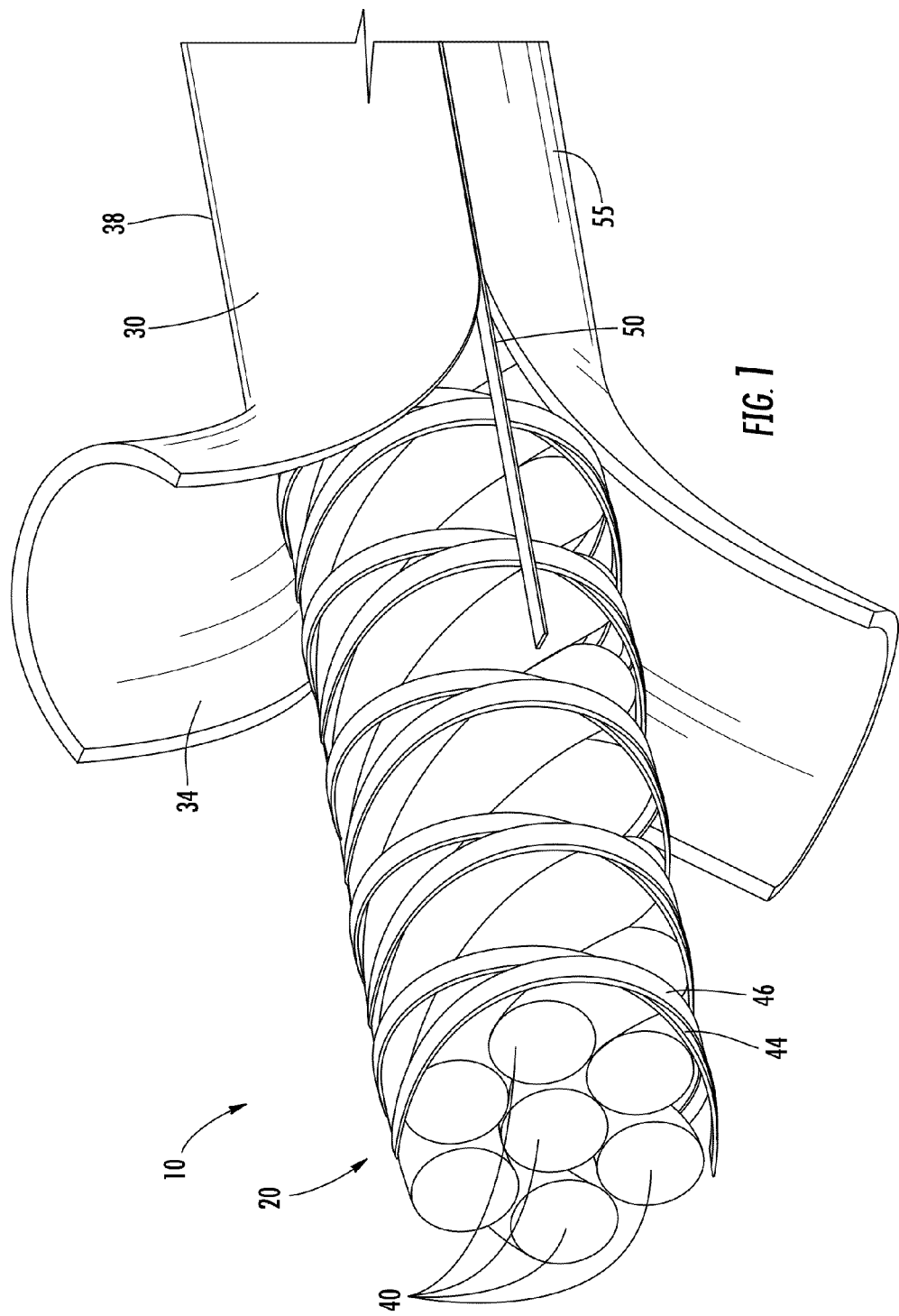
FIG. 1 is a partial cutaway view of a fiber optic cable according to a first embodiment.

FIG. 1 is a partial cutaway view of a fiber optic cable 10 according to a present embodiment. The cable 10 comprises a core 20 surrounded by a jacket 30. The jacket 30 has an interior surface 34 that faces the core 20, and an exterior surface 38. The jacket 30 can be formed primarily from polymer materials, and can be generally referred to as "polymeric." In this specification, the term "polymer" includes materials such as, for examples, copolymers, and polymer materials including additives such as fillers. The core 20 can be, for example, an assembly or arrangement having data-transmission and/or power-transmission capabilities. In the illustrated embodiment, the core 20 includes a bundle of optical fibers 40 bundled within contrahelically wound binders 44, 46.

The jacket 30 includes a separation feature that facilitates access to the core 20. In the exemplary embodiment, the separation feature is a pair of discontinuities 50 that extend along the length of the cable 30. In this specification, the term "discontinuity" indicates a portion of the jacket 30 of different material composition than the main portion of the jacket 30, the main portion being indicated by reference number 55. The main portion 55 can essentially be an annular hoop surrounding the core 20, with the discontinuities 50 extending longitudinally through the main portion 55 along the length of the cable 10. According to one aspect, the discontinuities 50 provide lines of weakness that allow the jacket to be separated 30 as shown in FIG. 1. The discontinuities 50 can conform to the profile of the main portion 55 so that the jacket 30 is a relatively uniform annulus.

Figure 2:
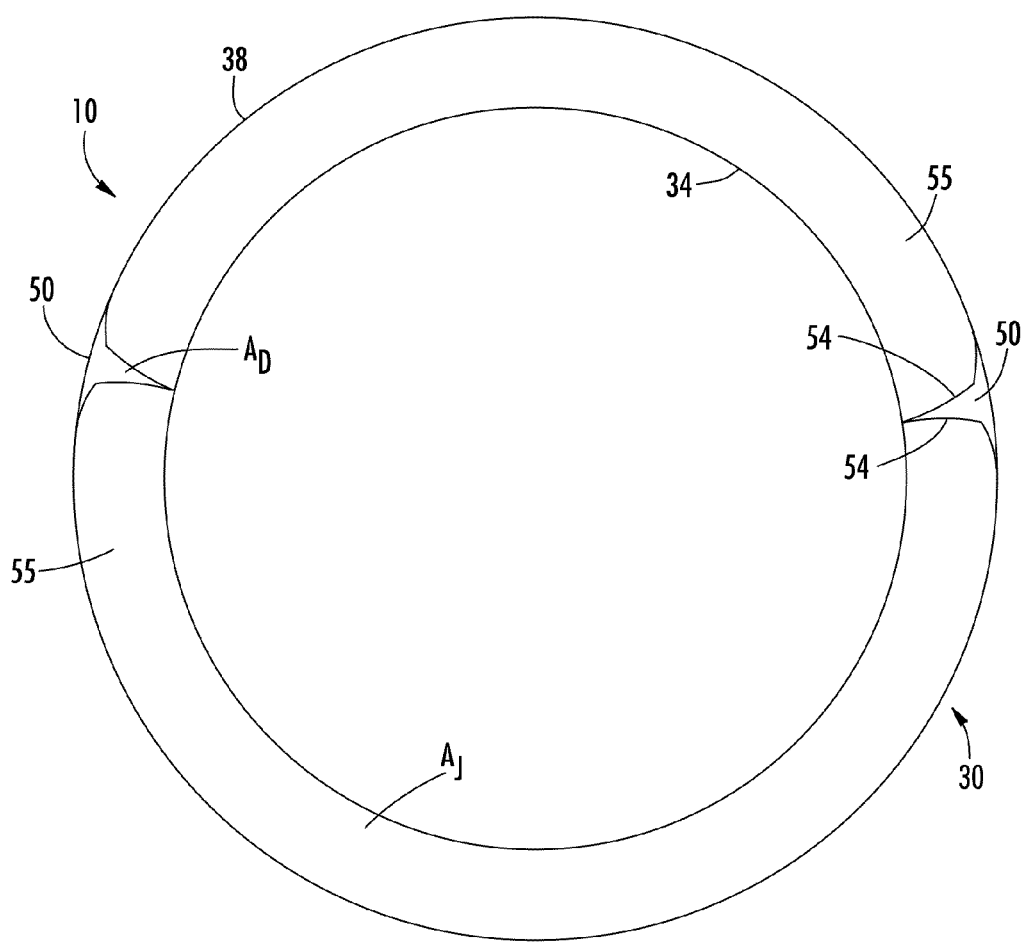
FIG. 2 is a cross section of the cable jacket illustrated in FIG. 1.

FIG. 2 is a cross-section of the jacket 30 in isolation, taken on a plane perpendicular to a length of the cable 10. In the exemplary embodiment, the discontinuities 50 are bonded to the main portion of the jacket 55 when the jacket 30 is extruded. The main portion 55 and the discontinuities 50 can be formed from extrudable polymers, so that as the extrudate used to form the main portion 55 and the discontinuities 50 cools and solidifies, the extrudates become bonded at an interface 54 on each side of a discontinuity 50. When the discontinuities 50 are formed while extruding in the same step as the main portion 55 of the jacket, the bond between discontinuity 50 and the remainder of the jacket 30 can be generally described as enabled by polymer chain entanglement as the jacket 30 solidifies. The jacket 30 accordingly comprises a cohesive composite structure. In FIG. 2 the interfaces 54 are shown as clear delineations, while in practice there may be a transition region between the materials of the main portion 55 and the discontinuities 50. The curved "T" shape of the discontinuities 50 in FIG. 2 are a result of one extrusion process that can be used to form the discontinuities, but other shapes are possible.

The discontinuities 50 can be relatively narrow strips in the jacket 30, and may occupy relatively small portions of the jacket cross-sectional area $A_J$. For example, the discontinuities 50 can have cross-sectional areas $A_D$ that are less than 10% of $A_J$, and as low as less than 5% or 3% of $A_J$. In the illustrated embodiment, the discontinuities 50 each have cross-sectional areas $A_D$ that are about 3% of $A_J$. In FIGS. 1 and 2, two discontinuities 50 are formed in the jacket 30 to facilitate opening of the jacket as shown in FIG. 1. Depending on the form that the core 20 takes, the number, spacing, shape, composition and other aspects of the discontinuities 50 can be varied. For example, a single discontinuity in the jacket 30 may be sufficient to allow the cable jacket 30 to be opened away from the core 20. The discontinuities in FIG. 1 are shown as rectangular strips for the purposes of illustration. In practice, the discontinuities may have curved or irregular shapes, and the discontinuities will generally fracture so that they remain attached to the main portion of the jacket.

Figure 3:
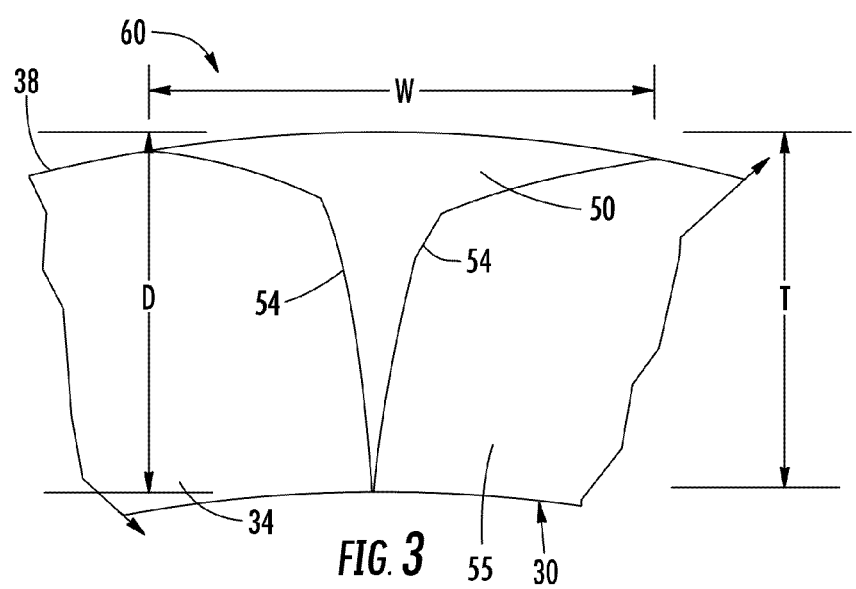
FIG. 3 is an isolated cross-sectional view of one of the discontinuities in the cable jacket of FIG. 2.

FIG. 3 is an isolated view of one of the discontinuities 50 in the jacket 30. In the illustrated embodiments, the width W of the discontinuity 50 is much greater near the exterior surface 38 of the jacket 30 than at the radially inward portion of the discontinuity 50. The discontinuities 50 can accordingly form a small, visible portion of the exterior surface of the cable jacket 30. This is due to the manufacturing process used to form the exemplary jacket, in which the extrudate used to form the discontinuity 50 was introduced from the direction 60, into the exterior of the jacket, and inwardly into the extrudate material used to form the main portion 55. The discontinuities 50 are thus progressively narrower as they extend radially inwardly. The discontinuity extends a depth D into the jacket 30, which has a thickness T. In this embodiment, the discontinuity 50 extends essentially from the exterior surface 38 to the interior surface 34 of the jacket 30. The depth D need not equal the thickness T, however. For example, discontinuities having depths D of at least 80% of the thickness T may be effective in providing tear locations for tearing the jacket 30. Discontinuities having depths D of at least 50% of the thickness T may also be effective in providing access locations for tearing the jacket 30. Depending on the jacket cross-section and materials used, discontinuities having depths D of at least 30% may be effective in facilitating access to the core.

The width W illustrated in FIG. 3 can correspond to a maximum width of the discontinuity 50. The width W is a measurement taken generally along the circumference of the jacket 30, or more specifically taken perpendicular to a radius bisecting a discontinuity 50. The width W can also be expressed as an arc length described in degrees. For example, the maximum width W of the discontinuity 50 shown in embodiment shown in FIG. 3 can be in the range of 0.5-2.0 mm. Stated alternatively, at its maximum width W, a discontinuity can traverse less than 20 degrees of arc along the circumference of the jacket 30 for small cable diameters. A discontinuity can traverse less than 10 degrees of arc for larger cables.

If an extremely thin, "film" type embodiment of discontinuity 50 is included, the maximum width W of a discontinuity can be in the range of 0.2 mm or less, and may be about 0.1 mm, corresponding to 1 degree of arc or less. Stated alternatively, at its maximum width W, a discontinuity can traverse less than 2 degrees of arc along the circumference of the jacket 30.

The materials and processes used to form the main portion 55 and the discontinuities 50 can be selected so that the interfaces 54 allow for relatively easy access to the core 20 by tearing the jacket 30 as shown in FIG. 1. The cable 10 may be constructed to meet other requirements for robustness, such as requirements for the jacket 30 stay intact under tensile loads, twisting, in temperature variations, and when subjected to other known cable test criteria, such as, for example, ICEA 460, and GR20.

The main portion 55 in the illustrated jacket 30 was extruded from medium density polyethylene (MDPE), and the discontinuities 50 were extruded from polypropylene (PP). The jacket 30 was formed in a coextrusion process so that the main portion 55 and the discontinuities 50 bonded during cooling to form relatively strong bonds at the interfaces 54. A cable formed in the process (not shown) also included water-swellable tape in the core 20 under binder threads. The cable jacket 30 was robust yet relatively low pull forces were sufficient to shear the jacket 30 along the discontinuities 50.

Without being bound by theory, Applicants believe the bond between polypropylene and polyethylene may be caused by one or both of quantities of ethylene that are compounded in the polypropylene bonding with the polyethylene (PE), and molecular entanglement between the PE and PP. According to this understanding, the amount of ethylene in the PP extrudate can be increased to increase the bond between the discontinuities and the remainder of the jacket. In general, if the main portion 55 of the jacket 30 is formed from a first polymer material, and the discontinuities are formed from a second polymer material, the discontinuities can include from 0.5%-20% by weight of the first polymer material.

If a narrow, thin film discontinuity 50 is included in the jacket, the content of the first polymer in the discontinuity can be similar to the embodiment of FIG. 2. One embodiment of a thin film discontinuity contains PP with about 9% PE. Higher PE contents, such as to up 20% PE, are also possible. PE contents of less than 0.2% in PP may result in insufficient bonding between the main portion and a discontinuity.

The inclusion of discontinuities 50 in the jacket 30 allows for a cable access procedure not available in conventional cables. Referring to FIGS. 1 and 2, the cable 10 can be accessed by scoring the end of an intact cable in the vicinity of the discontinuities 50. The cable end can be scored by, for example, a pair of snips, a knife, or some other bladed instrument. One or both sides of the torn jacket 30 can then be pulled back as shown in FIG. 1, with the jacket 30 tearing along the planes being created by the presence of the discontinuities 50. One or both sides of the jacket 30 can be pulled back to a desired length along the cable 10 to provide access to the core 20. The discontinuities are generally small enough so that they fracture and adhere to respective sides of the main portion 55 of the jacket 30. Discontinuities extending along the entire length of the cable 10 are effective in providing access to the core 20 according to this method. Shorter discontinuity lengths may also be effective however. For example, discontinuities having lengths of at least 10 centimeters along the length of the cable may be sufficient. The discontinuities 50 can be of different color than the main portion 55 so that they can be easily located and visible from the cable exterior. If the discontinuities 50 extend for a length along the jacket that is less than the entire length of the cable, different coloring of the discontinuities 50 can aid a technician in finding a location on the cable 30 to gain access.

The cable 10 can be manufactured using existing coextrusion equipment subject to minor modifications. For example, extruders from the Davis-Standard line of wire and cable extruders can be used to form a cable jacket according to the present embodiments. For example, a 1½ inch (40 mm) barrel diameter extruder and a larger barrel diameter extruder, such as a 3, 4, or 4½ inch extruder available from Davis-Standard, can be screwed into a crosshead in a configuration that would conventionally be used to extrude a cable jacket with the larger extruder, and a to extrude a stripe on the exterior of the cable jacket with the smaller extruder. In a conventional process, the stripe extrudate material is deposited on the surface of the jacket extrudate. According to the present embodiment, the flow of extrudate in the jacket extruder is diverted at the location or locations where the stripe extrudate material is introduced to the jacket extrudate. The diversion of the jacket extrudate creates a depression or trough in the flow of jacket extrudate, into which the extrudate material used to form a discontinuity is introduced. The jacket extrudate along with the with discontinuities formed therein then contracts and solidifies around a fiber optic core advancing through the crosshead.

Figure 4:
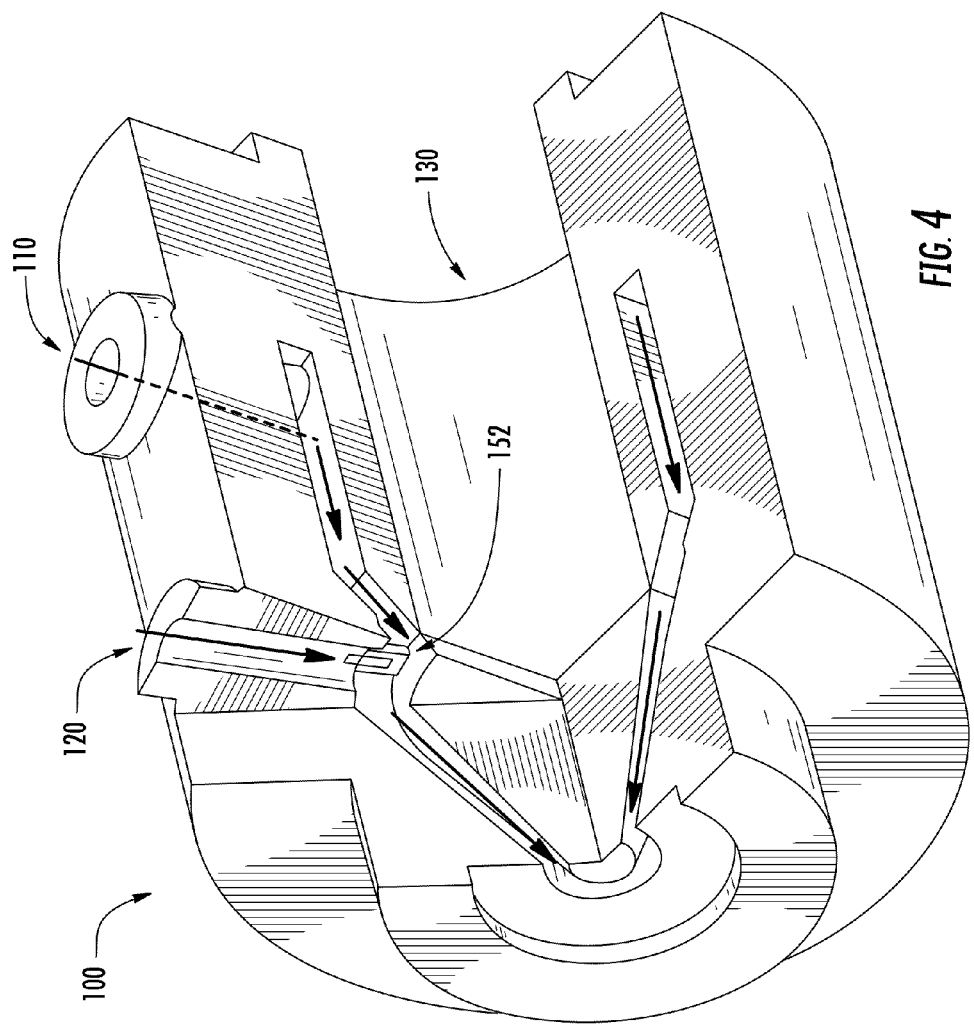
FIG. 4 is a cutaway view of a coextrusion apparatus used to manufacture cables with discontinuities.
Figure 5:
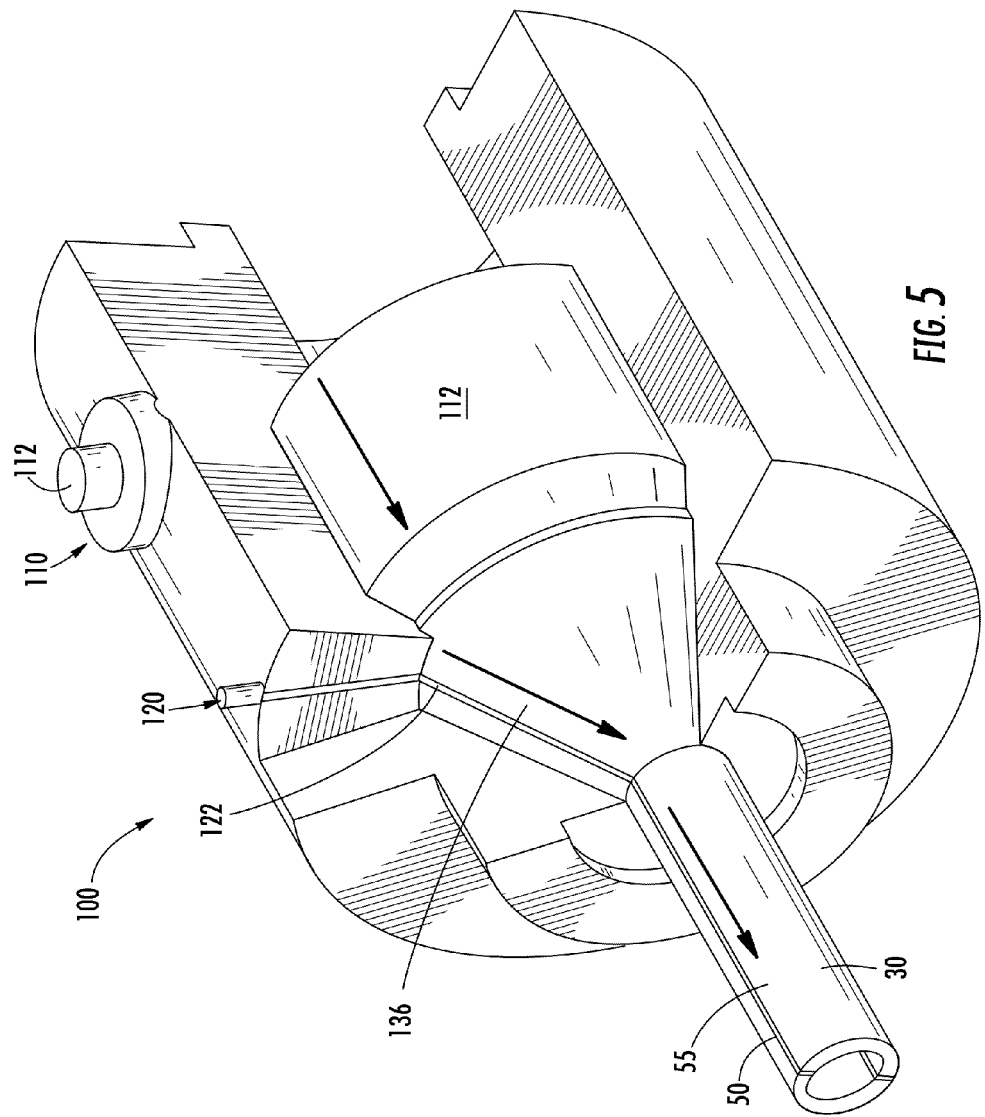
FIG. 5 is a cutaway view of the coextrusion apparatus of FIG. 4 illustrating extrudate material flow.

FIG. 4 illustrates a cutaway section view of a coextrusion apparatus 100 that can be screwed into a crosshead and used to manufacture a cable according to the present embodiments. The arrows in FIG. 4 illustrate the flow direction of extrudate. FIG. 5 illustrates the coextrusion apparatus 100 including representations of the extrudate materials forming the jacket 30. The apparatus 100 can generally be constructed from commercially available components used in a cable jacketing line with the capability to extrude stripes on a cable jacket, except for the modification described below. Referring to FIGS. 4 and 5, the apparatus 100 includes a first input port 110 that receives a first molten extrudate material 112 that is used to form the main portion 55 of the jacket 30. A second input port 120 allows introduction of a second molten extrudate material 122 used to form the discontinuities 50. A cavity 130 houses a tip (not shown) that in part defines the shape of the extrusion cone 136, and the ultimate form of the cable jacket.

Figure 6:
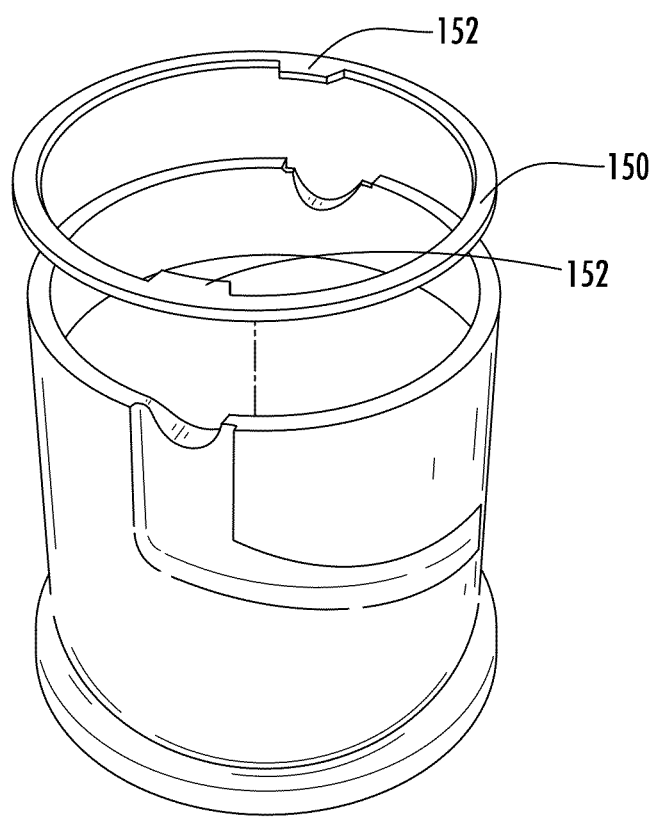
FIG. 6 illustrates a ring that can be used to modify conventional cable jacketing devices to form discontinuities.

FIG. 6 illustrates a ring 150 that is inserted in the apparatus 100 that enables formation of the discontinuities in the flow of the first extrudate material 112. The ring 150 includes two projections 152 that act to divert the flow of the first extrudate 112. The projections 152 divert the flow of the first extrudate 112 and create a trough or depression in the extrudate flow, into which the second extrudate material 122 flows as shown in FIG. 5.

Referring to FIG. 5, to form a fiber optic cable 10, a cable core (not shown) is advanced along the centerline 102 of the apparatus 100. First extrudate material 112 is pumped into the first input port 110, which then advances through channels in the apparatus 100 and travels over the tip (not shown). The projections 152 divert the flow of extrudate 112 and create troughs. At these locations, the second extrudate material 122 is introduced into the troughs. The second extrudate material 122 therefore flows as a liquid in the flow of first extrudate material 112 as the jacket is extruded. The extrusion cone 136, which is comprised of the first and second extrudate materials 112, 122, cools and solidifies around the core to form the jacket 30.

Figure 7:
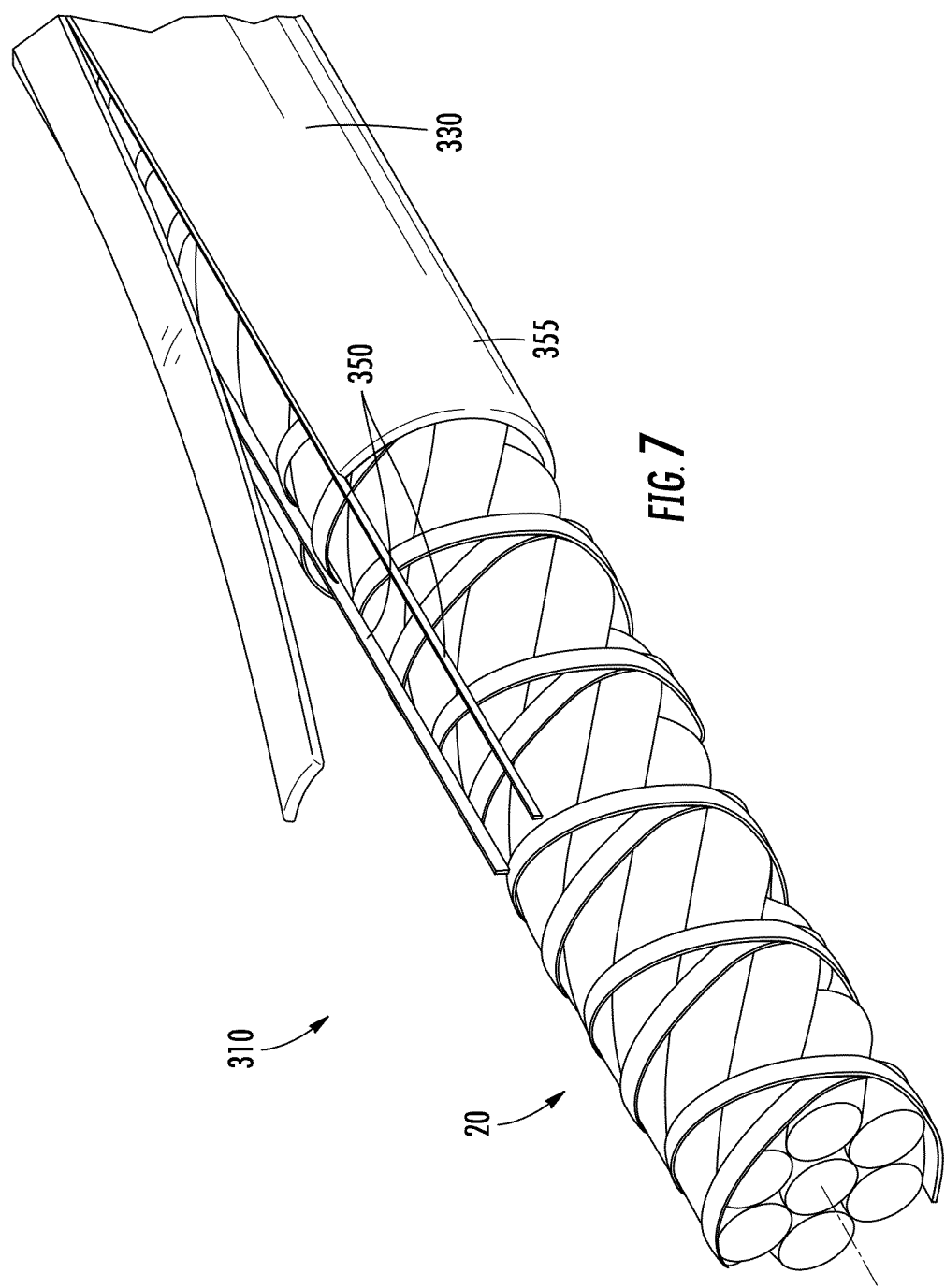
FIG. 7 is a partial cutaway view of a fiber optic cable according to a second embodiment.

FIG. 7 is a partial cutaway view of a fiber optic cable 310 according to a second embodiment. The cable 310 comprises a core 320 surrounded by a jacket 330, similar to the embodiment shown in FIG. 1. The jacket 330 includes a pair of discontinuities 350 that extend along the length of the cable 330. In this embodiment, the discontinuities 350 are relatively close together (e.g., within 90 degrees of each other) so that a narrow strip of jacket 330 can be peeled away from the core 320.

The cable jacket main portions 55, 355 and the discontinuities 50, 350 described in this specification can be made from various polymer materials. Either main portion or discontinuity may be made from polypropylene (PP), polyethylene (PE), or blends of materials such as a blend of PE and ethylene vinyl acetate (EVA), flame-retardant material such as flame-retardant polyethylene, flame-retardant polypropylene, polyvinyl chloride (PVC), or polyvinylidene fluoride PVDF, filled materials such as polybutylene terephthalate (PBT), a polycarbonate and/or a polyethylene (PE) material and/or an ethylene vinyl acrylate (EVA) or other blends thereof having fillers like a chalk, talc, or the like, and other materials such as a UV-curable acrylates.

In the exemplary embodiments, the first material may comprise at least 80% of a first polymer, polyethylene, by weight, and the second material comprises at least 70% of a second polymer, polypropylene, by weight and at least 0.5% of the first polymer polyethylene by weight. Higher amounts by weight of the first polymer may be included in the second material, such as at least 1.0%, or at least 2%.

In an alternative embodiment, polypropylene can be used as the first polymer primary component of the main portion of the jacket, and polyethylene can be used as the primary component in the discontinuities. In this case, amounts of polypropylene can be added to the polyethylene discontinuities to promote bonding between the discontinuities and the main portion.

In general, the desirable separation properties disclosed in this specification may be obtained by coextruding the discontinuities from a different material than the material used to form the main portion of the jacket. As an alternative method, the discontinuities may be made from the same material as the remainder of the jacket, but subjected to different curing conditions, for example.

The illustrated cores are capable of conveying fiber optic communication signals. In additional to optical fibers, or as an alternative to optical fibers, electrical conductors can be included in the cable core, so that the core is capable of conveying electrical communication signals.

Many modifications and other embodiments, within the scope of the claims will be apparent to those skilled in the art. For instance, the concepts of the present invention can be used with any suitable fiber optic cable design and/or method of manufacture. Thus, it is intended that this invention covers these modifications and embodiments as well those also apparent to those skilled in the art.

What is claimed is:
1. A cable, comprising:
a core comprising at least one optical fiber; and
a jacket surrounding the core, the jacket comprising:
    a main portion of a first extruded polymeric material that includes at least eighty percent by weight of a first polymer; and
    at least one discontinuity of a second extruded polymeric material that includes at least seventy percent by weight of a second polymer and at least 0.5 percent by weight of the first polymer, the discontinuity being bonded into the main portion and extending along a length of the cable, wherein the at least one discontinuity is of a different color than the main portion, thereby facilitating visible location of the at least one discontinuity, and wherein the at least one discontinuity forms a narrow strip in the jacket,
wherein the bond between the discontinuity and the main portion allows the jacket to be separated at the discontinuity to provide access to the core,
wherein the jacket is applied about the core by extruding the first material and the second material together.
2. The cable of claim 1, wherein the first polymer is polyethylene.
3. The cable of claim 2, wherein the second polymer is polypropylene.

4. The cable of claim 3, wherein the discontinuity extends along the entire length of the cable.

5. The cable of claim 3, wherein the at least one discontinuity includes two discontinuities that are spaced from one another in the jacket.

6. The cable of claim 3, wherein a cross-sectional area of each of the at least one discontinuity is less than five per cent of a cross-sectional area of the jacket.

7. The cable of claim 3, wherein the at least one discontinuity has a maximum width measured perpendicular to a radius passing through the discontinuity that is less than 2 mm.

8. The cable of claim 1, wherein jacket is an annular tube and surrounds the core, and wherein the core comprises a bundle of optical fibers bundled within wound binders.

9. A cable, comprising:
a core comprising at least one optical fiber; and
a jacket surrounding the core, the jacket comprising:
a main portion of a first material; and
at least one discontinuity of a second material bonded to the main portion, the first material being different from the second material, wherein the discontinuity facilitates controlled tearing of the jacket to provide access to the core, wherein the at least one discontinuity is of a different color than the main portion, and wherein the at least one discontinuity forms a narrow strip in the jacket,
wherein the first material is comprised of at least eighty percent by weight of a first polymer, and wherein the second material is comprised of at least seventy percent by weight of a second polymer and at least 0.5 percent by weight of the first polymer, thereby facilitating bonding of the first and second materials.

10. The cable of claim 9, wherein the at least one discontinuity comprises less than 20 percent by weight of the first polymer.

11. The cable of claim 10, wherein the second material is comprised of at least 1 percent by weight of the first polymer.

12. The cable of claim 11, wherein the second material is comprised of at least 2 percent by weight of the first polymer.

13. The cable of claim 12, wherein the first polymer is polyethylene.

14. The cable of claim 13, wherein the second polymer is polypropylene.

15. A method of making a cable, comprising:
advancing a core including at least one optical fiber in a first direction; and
extruding a jacket around the core, the extruding comprising:
introducing a first polymeric extrudate material into the extrusion apparatus;
forming at least one trough in a flow of the first extrudate material;
introducing a second extrudate material into the trough to form at least one discontinuity in the first extrudate material, wherein the at least one discontinuity is of a different color than the first extrudate material, and wherein the at least one discontinuity forms a narrow strip in the jacket; and
allowing the first and second extrudate material to draw down and cool around the core, wherein the first and second material form a jacket around the core, wherein the second extrudate material bonds to the first extrudate material.

16. The method of claim 15, wherein the first extrudate material is comprised of at least eighty percent by weight of a first polymer, and wherein the second extrudate material is comprised of at least seventy percent by weight of a second polymer and at least 0.5 percent by weight of the first polymer.

17. The method of claim 16, wherein the first polymer is polyethylene.

18. The method of claim 17, wherein the second polymer is polypropylene.

19. The method of claim 18, wherein jacket is an annular tube and surrounds the core, and wherein the core comprises a bundle of optical fibers bundled within wound binders.

* * * * *